United States Patent [19]
Suto et al.

[11] Patent Number: 4,787,085
[45] Date of Patent: Nov. 22, 1988

[54] DIGITAL SIGNAL TRANSMITTING SYSTEM

[75] Inventors: Kohichi Suto; Hisayoshi Sugiyama, both of Kanagawa; Akira Sakamoto, Tokyo; Takeshi Fukami, Kanagawa; Toshiro Terauchi, Tokyo; Masakatsu Toyoshima, Kanagawa, all of Japan

[73] Assignees: Nippon Telegraph and Telephone Corporation; Sony Corporation, both of Tokyo, Japan

[21] Appl. No.: 55,513

[22] Filed: May 29, 1987

[30] Foreign Application Priority Data

May 30, 1986 [JP] Japan .................. 61-125116

[51] Int. Cl.⁴ .............................................. H04J 3/12
[52] U.S. Cl. .................... 370/110.1; 455/6; 381/2
[58] Field of Search .................. 370/85, 110.1, 110.2; 340/825.5; 455/6; 381/2

[56] References Cited
U.S. PATENT DOCUMENTS

3,985,965 10/1976 Field et al. .................. 370/110.2
4,380,064 4/1983 Ishikawa et al. ............. 370/110.2
4,554,658 11/1985 Marten et al. ................ 370/110.2

Primary Examiner—Douglas W. Olms
Assistant Examiner—Frank M. Scutch, III
Attorney, Agent, or Firm—Hill, Van Santen, Steadman & Simpson

[57] ABSTRACT

A digital signal transmitting system includes a plurality of digital signal reproducers, each outputting a digital data signal to be time-division multiplexed; a digital signal multiplexer supplied with a frame synchronizing signal, a service bit signal and the output digital signals from the reproducers and for producing a block data signal including the frame synchronizing signal, the service bit signal and a plurality of slot data bits arranged with the digital data signals, each one bit within a multiple-frame, in which the service bit signal is indicative of the transmission mode and the slot data associated with each of the plurality of digital data signals being transmitted.

9 Claims, 4 Drawing Sheets

FIG. 7A  Slot Information
FIG. 7B  Data Extracting Pattern
FIG. 7C  Data Block
FIG. 7D  Extracted Data
FIG. 7E  Output Data

DIGITAL SIGNAL TRANSMITTING SYSTEM

BACKGROUND OF THE INVENTION

1. Field of the Invention

The present invention relates generally to a digital signal transmitting system, and more particularly to a transmitting system of this kind which is capable of arbitrarily changing the service speed of one block data and simultaneously transmitting digital data and a service bit indicative of the time slots in which the digital data is delivered.

2. Description of the Prior Art

In the past, a digital data transmitting system for multiplexing digital data in a plurality of channels and transmitting the multiplexed data in one CATV channel band width has been proposed by the applicant of the present invention described in U.S. patent application Ser. No. 669,376, entitled "Digital Terminal Address Transmitting System For CATV".

According to the above-mentioned digital signal transmitting system, it is possible to time-division multiplex digital data (or stereo digital audio signals) of a plurality of channels in a predetermined format and to transmit the same to each terminal.

However, this system cannot time-division multiplex a variety of digital data in a predetermined band width and also cannot arbitrarily change the transmission rate of transmitted data.

OBJECTIONS AND SUMMARY OF THE INVENTION

Accordingly, it is a primary object of the present invention to provide a new digital signal transmitting system which overcomes the above disadvantages.

It is another object of the present invention to provide a digital signal transmitting system which can arbitrarily change the service speed of digital data.

It is a further object of the present invention to provide a digital signal transmitting system which transmits a service bit signal indicative of data slot information associated with digital data.

In accordance with one example of the invention, a digital signal transmitting system is provided, which includes:

(a) a plurality of digital signal reproducers, each outputting a digital data signal to be time-division multiplexed:

(b) a digital data multiplexer supplied with a frame synchronizing signal, a service bit signal and the output signals of the plurality of digital signal reproducers, for producing block data signals including the frame synchronizing signal, the service bit signal and a plurality of slot data signals arranged with the digital data signals within a multiple-frame, in which the service bit signal is indicative of the transmission mode and the slot data to be transmitted with each of the plurality of digital data signals; and (c) means for modulating the output of the digital signal multiplexer so as to transmit the same through a transmission line.

These and other objects, features and advantages of the present invention will become apparent from the following detailed description of the preferred embodiment, taken in conjunction with the accompanying drawings, throughout which like reference numerals designate like elements and parts.

DESCRIPTION OF THE PREFERRED EMBODIMENTS

Now, an embodiment of a digital data transmitting system according to the present invention will hereinafter be described with reference to the accompanying drawings.

Figure 1:
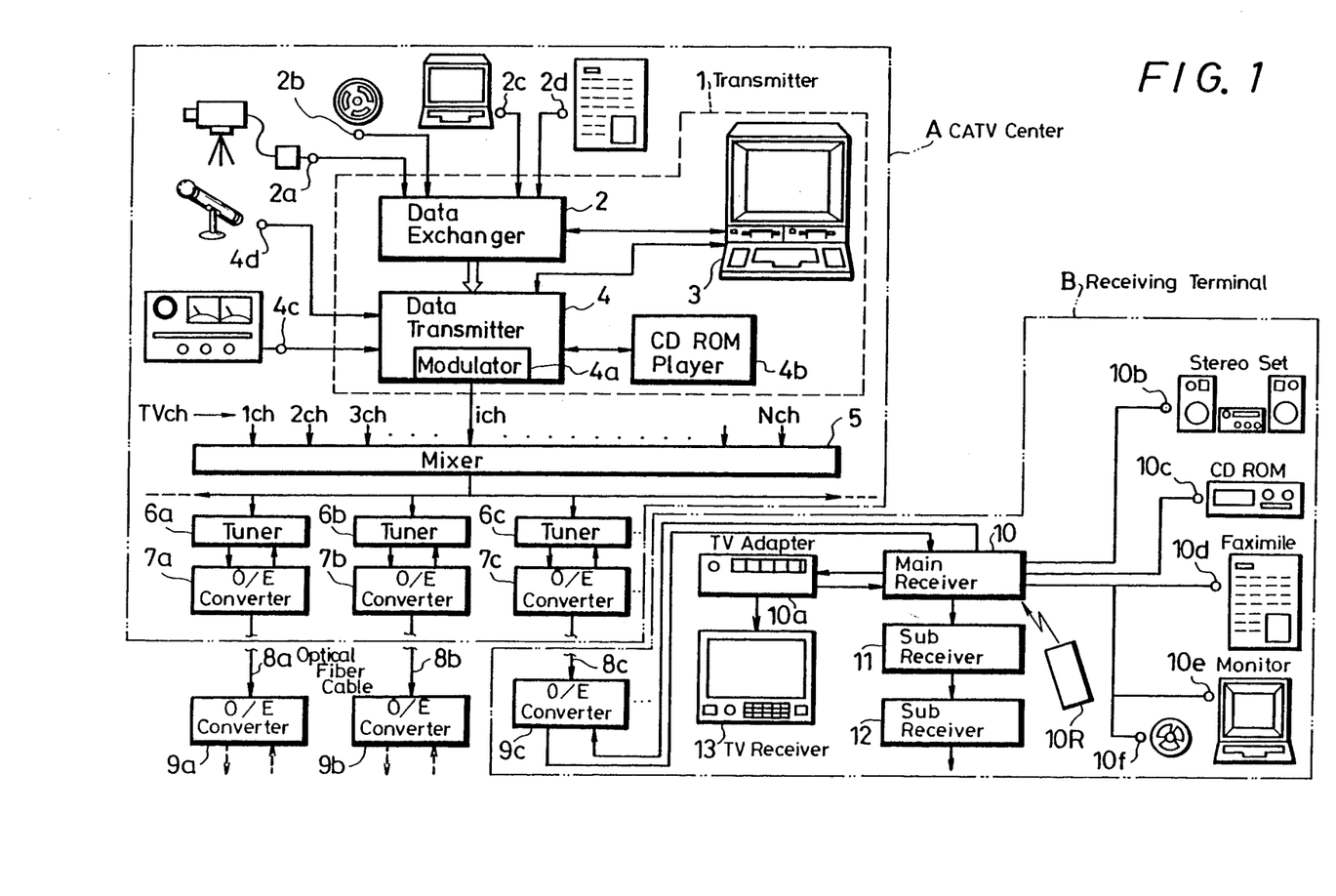
FIG. 1 is a block diagram showing an illustrative embodiment of a digital, signal transmitting system according to the present invention.

In the following, it will be explained that the digital data transmitting system of the present embodiment is used in a digital multi-media service system (hereinafter simply called "the DMS system") as shown in FIG. 1.

This DMS system is provided in its CATV center A with a transmitter 1 in which a variety of data signals for computer, digital audio data, and so on delivered thereto are time-division multiplexed by a method, desoribed hereinafter, and then the multiplexed digital signal is modulated to form a signal in a band width corresponding to one channel portion of a television broadcasting signal to be supplied to a mixer 5. The mixer 5 mixes television broadcasting signals in a plurality of channels with the digital multiplexed signals, by changing a carrier of the digital multiplexed signals, and supplies the mixed signal to a plurality of tuners 6a, 6b, 6c... provided in the CATV center A. A separate one of the tuners 6a, 6b, 6c... is provided for each, e.g. user who contracts to use the CATV system. Each of the tuners 6a, 6b, 6c... is informed of a channel to be selected by a selection signal supplied thereto from a receiving terminal B, described hereinafter. In each of the tuners 6a, 6b, 6c..., a signal of the selected channel is demodulated to a demodulated signal of a base band and then, the demodulated signal is supplied to each of a plurality of opto-electric converters (O/E converters) 7a, 7b, 7c... corresponding to the tuners 6a, 6b, 6c...

There, the demodulated signal is converted into an optical signal which in turn is supplied to each of a plurality of optoelectric converters 9a, 9b, 9c... provided in the receiving terminal, of e.g. each family, through each of a plurality of bidirectionally communicable optical fiber cables 8a, 8b, 8c... Assuming that the opto-electric converter 9g is provided e.g. in a receiving terminal B in a home, the O/E converter 9c is connected with a main receiver 10 in the receiving terminal B so that the main receiver 10 is supplied with the electric demodulated signal converted from the optical signal by the O/E converter 9c. The main receiver 10 has a front panel constructed as shown e.g. in FIG. 2. The main receiver 10 delivers the demodulated signal supplied thereto either directly to a TV adaptor 10a or to output terminals 10b-10f respectively connected to a variety of reproducers, described hereinafter. The signal is subjected to a predetermined processing as well as to a first sub receiver 11 and a second sub receiver 12 which are serially connected with each other in this order.

A received channel selection can be made by the main receiver 10 or a remote controller 10R which transmits a control signal to the main receiver 10. A receiving channel selection signal is supplied from the main receiver 10 to the tuner 6c in the CATV center A through a reverse path, that is, through the optoelectric converter 9c, the optical fiber cable 8c and the optoelectric converter 7c. The tuner 6c demodulates, in response to the selection signal, only the signal of a desired channel from signals of a plurality of channels supplied from the mixer 5 and supplies the same to the main receiver 10 in the receiver terminal B.

When the signal supplied is a demodulated signal of a television broadcasting channel, the main receiver 10 supplies the demodulated signal without modification to the TV adaptor 10a. The TV adaptor 10a in turn adjusts the supplied signal and then supplies the adjusted signal to a TV receiver 13, whereby a television program is displayed on the screen thereof.

On the other hand, when the signal supplied is a demodulated signal of a channel of digital multiplexed signals, the main receiver 10 effects a predetermined signal processing, described hereinafter, and thereafter supplies the processed signal, that is, a digital audio signal or data signal to one of the terminals 10b-10f.

The digital multiplexed signal is delivered from the CATV center A under the control of a system controller 3 provided in the transmitter 1. Data delivered to a data exchanger 2, that is, a signal representative of a digitized still video image supplied to a terminal 2a, a computer data signal supplied to a terminal 2b, a data signal such as that produced by a computer game software or the like supplied to a terminal 2c, a facsimile data signal supplied to a terminal 2d, or the like, is converted into a signal suitable to be arranged in a format, later referred to, under control of the system controller 3. The converted data signal is supplied to a data transmitter 4. Also supplied to the data transmitter 4 are data reproduced from a CD ROM by a CD ROM player 4b, a two-channel stereo digital audio signal (a 16-bit signal adapted to a CD standard or the like) from a terminal 4c, and a monaural digital audio signal (a non-linear modulated 8-bit signal) from a terminal 4d. Each of the respective supplied signals is multiplexed by the data transmitter 4, in a format described hereinafter, in response to an instruction from the system controller 3, as a digital multiplexed signal and is then modulated by a modulator 4a to a signal in a band width corresponding to one channel portion of television broadcasting signals. In this multiplexing process, mode-associated data and special information are multiplexed. The modulated digital multiplexed signal is supplied to the mixer 5 to generate a CATV signal by modulating the digital multiplexed signal in a predetermined channel, the CATV signal being transmitted to the tuners 6a, . . . in the CATV center A.

When a channel oorresponding to the digital multiplexed signal transmitted in the above described manner is selected e.g. by the tuner 6c in response to the selection signal delivered from the receiving terminal B, the demodulated signal of this digital multiplexed signal is supplied to the main receiver 10 of the receiving terminal B. When the digital multiplexed signal is supplied to the main receiver 10, e.g. in response to signals indicative of the signal mode and identification information contained in the digital multiplexed signal, signals indioative of the mode of the supplied signal and identification information are supplied to the terminal 10e so as to display, the mode of the supplied signal and identification information e.g., on the screen of a monitoring apparatus connected to the terminal 10e. Then, the operator, following the display on the screen of the monitor, operates the front panel of the main receiver 10 or the remote controller 10R to select desired data from the digital multiplexed signals and to supply the same to one of the output terminals 10b-10f corresponding to the selected data.

To be specific, if e.g. a digital audio signal or digital voice signal is selected, the terminal 10b connected to a stereo reproducer is supplied with a digital audio signal or a digital voice signal. If data reproduced from the CD ROM is selected, the terminal 10c connected to a CD ROM data decoder is supplied with the reproduced data of the CD ROM. If a facsimile data signal is selected, the terminal 10d connected to a fascimile apparatus is supplied with the fascimile data signal. If a signal representative of a still video image is selected, the terminal 10e connected to the monitoring apparatus is supplied with the still video image signal. If a computer data signal is selected, the terminal 10f connected to a personal computer is supplied with the computer data signal.

The DMS system is thus constituted, wherein each apparatus provided in the receiving terminal B is supplied with a television broadcasting signal or a digital data signal from the CATV center A through the optical transmission line.

Reference is next made as to a format of digital data signals supplied from the CATV center A to the receiving terminal B through the above described DMS system.

Figure 3:
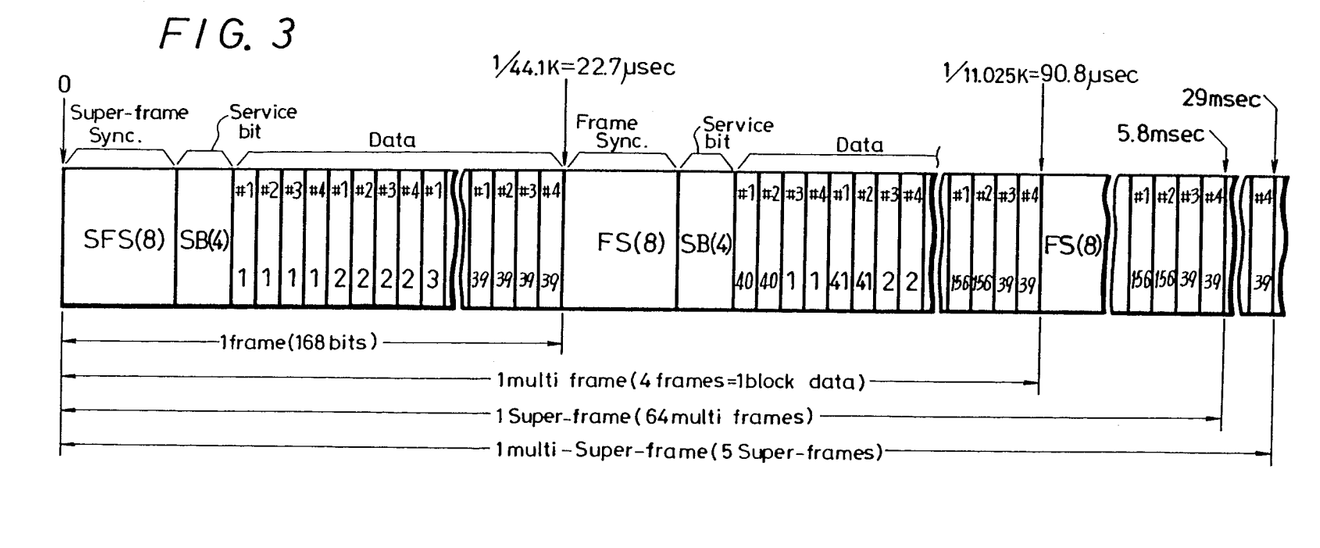
FIG. 3 is an explanatory diagram showing an example of a frame format used in the digital signal transmitting system according to the present invention.

FIG. 3 roughly shows a format of a digital data signal according to the present embodiment. The format is formed of multiple frames, each of which has a capacity of 168 bits of binary coded signals, that is, H (High) or L (Low). The cyclic period of one frame is determined as 1/44.4 kHz, which is expressed as approximately 22.7 μsec in transmitting speed. As shown in FIG. 3, one multi-frame is formed of 4 frames, and one super-frame is formed of 64 multi-frames. Further, one multi-super-frame is formed of 5 super-frames. Therefore, it takes 29 msec to transmit one multi-super-frame. It is assumed that one multi-super-frame is a transmission unit and no mode change is allowed within each multi-super-frame. The mode selection with be explained later in detail.

In each frame, there are arranged from its head an 8-bit frame synchronizing signal (FS), a 4-bit service bit (SB) and a 156-bit data word. The 156-bit data word is arranged in a manner that 4 different data programs #1-#4 are time-division multiplexed and transmitted one bit at a time in turn. To be specific, in the 156-bit data word there are allocated from its head the first bit of the program #1, the first bit of the program #2, the first bit of the program #3, the first bit of the program #4, the second bit of the program #1, and so on in this order. One frame accomodates 39 bits of each of the respective programs #1-#4. The first frame arranged at the head of one super-frame has a super-frame synchronizing signal (SFS) in place of the frame synchronizing signal.

It is assumed hereinafter that data to be transmitted in the present embodiment is data for a computer or the like, and 16-bit digital stereo audio signals as an audio signal and 8-bit digital monaural voice signals as a voice signal. Therefore, one channel portion of the audio signal, which is formed of 32 bits, i.e. 16 bits for each of the right and left channels, can be accomodated in one program of 39 bits, so that one channel portion of the audio signal can be transmitted in one frame. One channel portion of the voice signal is formed of 8 bits, so that 4 channel portions thereof can be accomodated in the 39-bit program and transmitted at one time. A data signal for a computer or the like, that is, a signal processed by the data exchanger 2 in FIG. 1, has a quantity of data transmitted at one time which varies according to the service speed. If $f_0$ represents the service speed (11.025 kHz) at which one bit is transmitted per one multiframe, the service speed can be selected from $f_0$, $2f_0$, $4f_0$, $8f_0$, $16f_0$, $32f_0$, $64f_0$, $128f_0$, $256f_0$, and so on. If $f_0$ is selected, 156 channels (kinds) of data can be transmitted in one program. If $156f_0$ is selected, one channel (kind) of data can be transmitted in one program. In the data transmission, each of the data bits in the multi-frame is designated by a slot number from 1 to 156. A classification of data contained in each slot-numbered data bit is shown as data information of the service bit, described hereinafter.

Figure 4:
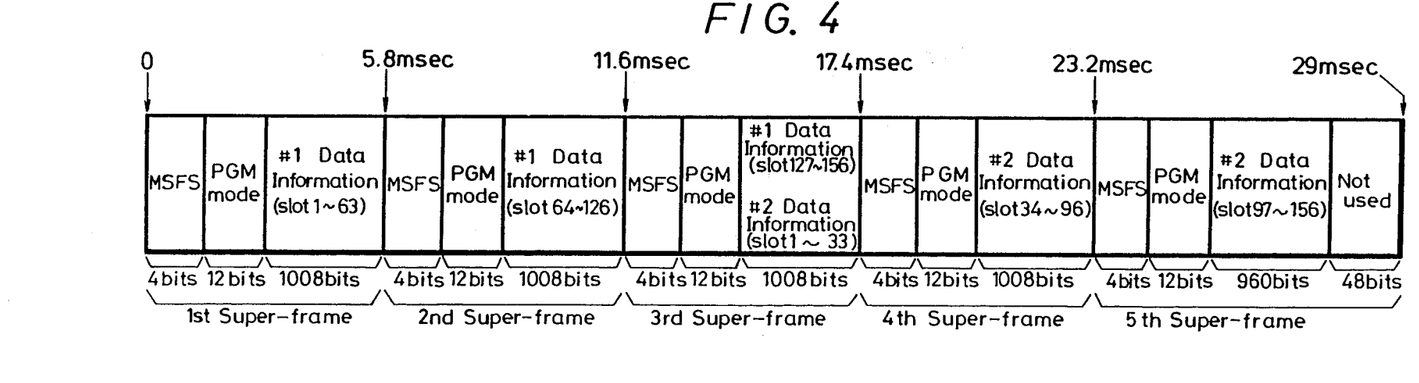
FIG. 4 is an explanatory diagram showing an example of a service bit used in the digital data transmitting system of the present invention.

The content of data thus transmitted is shown by the 4-bit service bit of each frame. The service bit is constructed at every multi-super-frame as a block unit, as shown in FIG. 4. To be specific, FIG. 4 shows the service bits extracted from transmitted signals contained in one multi-super-frame. One multi-super-frame has a total of 5120 bits of service bits, and therefore one super-frame has 1024 bits of service bits. Specifically, the service bit shown in FIG. 4 is constructed as follows: From the head of each super-frame there are placed a 4 bit multi-super-frame synchronizing signal MSFS, a 12-bit program (PGM) mode signal and 1008-bit data information signal in this order. The super-frame located at the head of each multi-superframe has the MFS signal, the 4 bits of which are all set at H level. The 4 bits of the MSFS signal of other super-frames are all set at L level. The 12-bit PGM mode signal is divided by 3 bits into 4 portions which respectively correspond to the channels #1–#4. Each 3-bit portion is used to designate information corresponding to a program data mode as shown in Table 1.

TABLE 1

| Mode | Bit Pattern | Program No. | Mode Information |
|---|---|---|---|
| 1 | L L L | 1-4 | 16-bit Stereo Audio Signal of CD (Emphasis Off) |
| 2 | L L H | 1-4 | 16 bit-Stereo Audio Signal of CD (Emphasis On) |
| 3 | L H L | 1-4 | 16-bit digital Audio Signal (Emphasis Off) |
| 4 | H L L | 1, 2 | 156 bits/1 multi-frame data signal |
|   |   | 3, 4 | 8-bit digital monaural Voice Signal |
| 5 | H L H | 1-4 | Data Signal of CD ROM |
| 6 | H H L | 1-4 | Non Data |

There are 6 transmission modes Mode 1–Mode 6 available in the present embodiment. Mode 1 shows that a program is a 16-bit stereo digital audio signal reproduced from a compact disk (CD) without emphasis (emphasis off). Mode 2 shows that a program is a 16-bit stereo digital audio signal reproduced from a CD with emphasis (emphsis on). Mode 3 shows that a program is a digital audio signal converted from an analog signal, equivalent to a digital audio signal reproduced from a CD. Mode 5 shows that a program is a data signal read from a CD ROM. Mode 6 shows that there is no data in the concerned program. Mode 4 shows different information according to the program number. When the program #1 or #2 is concerned, it shows that the data transmitted is a data signal of 39 bits per frame (156 slots as a block unit of one multi-frame) processed by the data exchanger 2 appearing in FIG. 2. When the program #3 or #4 is concerned, it shows that the data transmitted are 4 channel portions of the 8-bit monaural voice signal.

A slot information portion of 1008 bits is divided into 63 slots (1 slot=16 bits) at every multi-super-frame. Thus, one multi-super-frame can show 315 slots. However, the last 3 slots (48 bits) are left unused, so that actually 312 slots are shown by one multi-super-frame. The former half of the 312 slots, i.e. 56 slots correspond to the slot numbers 1–156 of data bits contained in the program #1, and the latter 156 slots correspond to the slot numbers 1–156 of data bits contained in the program #2. The first 8 bits of each slot constitutes address data (slot data) 0–255 which indicates to which service the data bit corresponding to each slot belongs. When the address data has a value "0", it means that the corresponding data bit has no signal. The last 8 bits of each slot constitute password data 0–255 indicative of a password of the data bit corresponding to each slot. Each of the receiving terminals has a password previously determined at the time of contract and can exclusively receive data transmitted with its associated password. When the password has a value "0", it means that the data can be received by all of the receiving terminals without restriction.

The format of the signals transmitted from the transmitter 1 is constituted as described above.

Reference is next made as to how the receiving terminal B of the DMS system as shown in FIG. 1 receives transmitted data arranged in the above described format.

Figure 2:
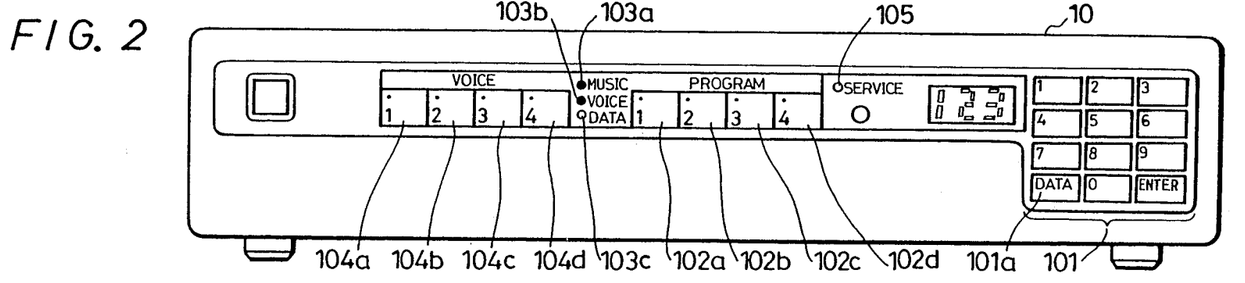
FIG. 2 is a front view showing an example of a receiving terminal to the present invention.

First, a digital data signal to be received is selected from those transmitted from the transmitter 1 by the main receiver 10 of the receiving terminal B (or the remote controller 10R). To be specific, a transmission channel of a desired digital data signal is selected from CATV broadcasting channels by operating channel selection switches 101 arranged in a ten-key pad on the front panel of the main receiver 10, as shown in FIG. 2. Then, the selected digital data signal is demodulated by the tuner 6c and the demodulated digital data signal is supplied to the main receiver 10.

The digital signal has 4 programs #1-4 from which the operator selects a desired one by operating program selection switches 102a–102d. The main receiver 10 determines the mode information of the service bit contained in the selected digital data signal and indicates the mode of the selected program by lighting one of the indicator lamps 103a–103c. If the program is of the audio signal mode (coming under modes 1, 2, 3 in Table 1), the indicator lamp 103a is lit. If the program is of the monaural voice signal mode (coming under mode 4 for programs #3 and #4 in Table 1), the indicator lamp 103b is lit. Further, if the program is of the data signal mode (coming under mode 4 for programs #1 and #2 or mode 5 for all the programs in Table 1), the indicator lamp 103c is lit.

When the selected program is an audio signal, the audio signal only is extracted from the program and supplied from the main receiver 10 to the terminal 10b connected to a stereo reproducer.

When the selected program is a voice signal, since one program has 4 channels of signals, the operator selects a desired channel by operating 4 voice channel selection switches 104a–104d, whereby only the voice signal of the selected channel is extracted and supplied from the main receiver 10 to the terminal 10b.

When the selected channel is a data signal (except for signals reproduced from a CD ROM), since one program possibly has maximum of 156 channels dependent on the data transmission speed, the operator selects a desired one by operating the channel selection keys 101. It should be noted in this case that e.g. a data channel selection switch 101a is also used so as to distinguish the data channel selection from the transmission channel selection. After the above operation, it is determined whether or not the particular selected data channel exists, by checking the service bit of the selected data channel as well as whether or not the concerned data channel has a contract password and therefore can be received by the receiving terminal B by detecting the password of the data channel. If the results of the two determinations are both affirmative, a service indicator lamp 105 is lit to inform the operator that the selected data channel is receivable. Then, only the data signal of the selected channel is extracted and supplied to one of the terminals 10d–10f respectively connected to an apparatus such as a computer or the like which needs data.

When the selected program is a signal reproduced from a CD ROM, only the signal reproduced from the CD ROM is extracted and supplied to the terminal 10c connected to the CD ROM decoder.

According to the present embodiment, the main receiver 10 can select the program, and the channel of the digital data signal and supply the selected data to the associated apparatus, as explained above.

Next, reference is made as to how data to be transmitted is arranged in the format shown in FIG. 3.

Figure 5:
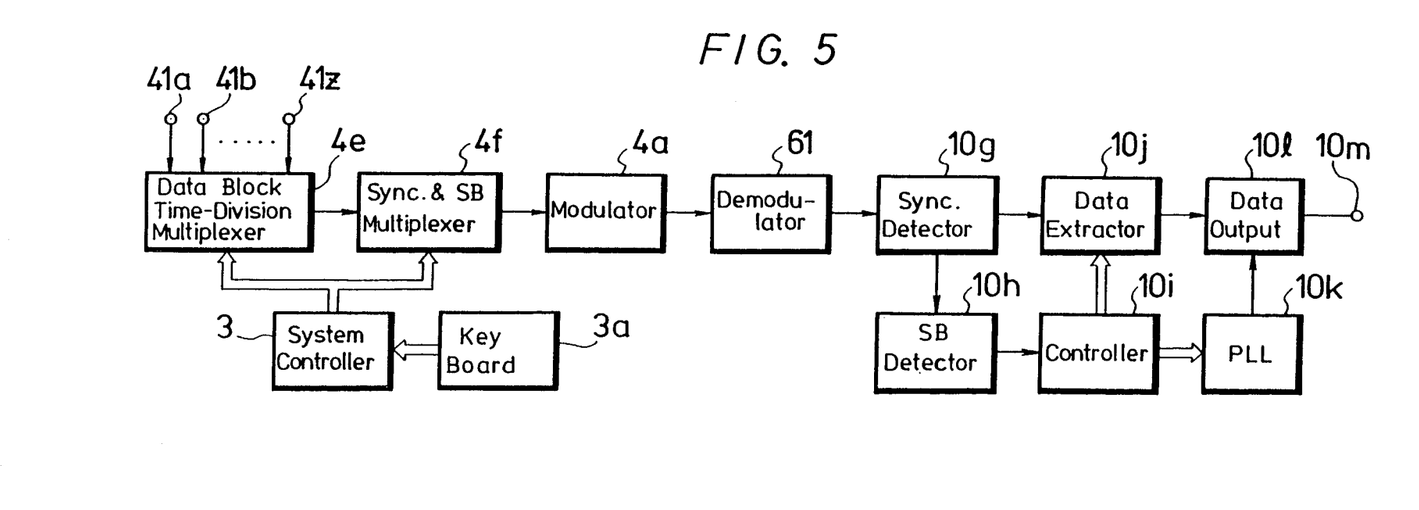
FIG. 5 is a circuit block diagram showing a main portion of digital signal modulator and demodulator sections of the present invention.

FIG. 5 shows a transmitting section which arranges a data signal in the format shown in FIG. 3 and transmits the formatted data signal, and a receiving section which receives the transmitted signal. In FIG. 5, reference numerals 41a, 41b, . . . 41z respectively designate terminals which are supplied with digital data signals from the aforementioned data exchanger 2, CD ROM player 4b and so on appearing in FIG. 1. The digital data signals supplied to the terminals 41a, 41b, . . . 41z are next supplied to a data block time-division multiplexing section 4e arranged in the data transmitter 4 in FIG. 1. When a digital data signal is supplied to the time-division multiplexing section 4e, if the clock frequency of the supplied digital data signal is not adequate to the formatting, the digital data signal is resampled so as to have a frequency adaptable to the data block frequency (11.025 kHz).

The data block time-division multiplexing section 4e time-division multiplexes digital data signal supplied to the terminals 41a, 41b, . . . 41z under control the system controller 3 in response to an input operation effected on a keyboard 3a. The signals which are first multiplexed are the respective programs #1–#4 in the data section, in the format shown in FIG. 3. In other words, a 156-bit data block formed of all program data contained in one multi-frame is multiplexed.

Let it be assumed, for facilitating the explanation of the present embodiment, that one data block has 8 bits. For illustration, let digital data A be supplied to the terminal 41a at service speed $3f_0$, digital data B be supplied to the terminal 41b at service speed $4f_0$ and digital data C be supplied to the terminal 41c at service speed $1f_0$, as shown in FIG. 1. The data block time-division multiplexing section 4e delivers to its data output terminal 4e' an 8-bit signal formed by time-division multiplexing 3 bits of the data A, 4 bits of the data B and 1 bit of the data C at every data block. Each data block signal thus multiplexed and delivered to the terminal 4e' is supplied to a synchronizing bit and service bit adding section 4f wherein the aforementioned synchronizing bit and service bit are added to the multiplexed data block under control of the system controller 3. Then, the digital data signal formatted as shown in FIG. 3 is supplied to the modulator 4a from which the signal is delivered to a transmission line (the transmission line in the CATV center A).

Figure 6:
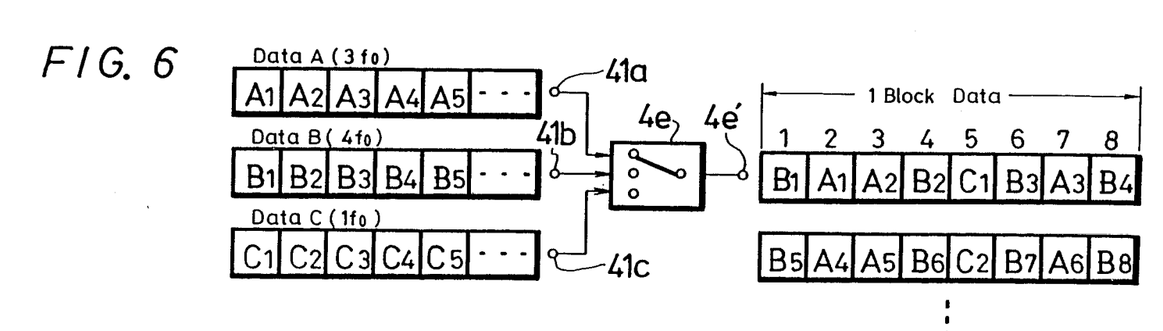
FIGS. 6 and 7a through 7e data tables for explaining time-division multiplexing of one block of data and demultiplexing of the same according to the present invention.
Figure 7A:
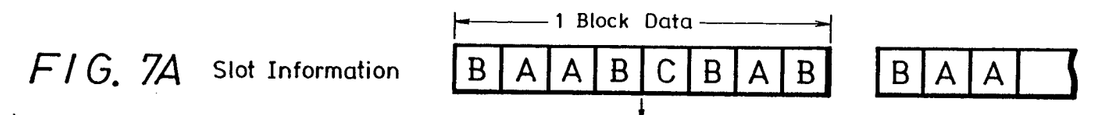
Figure 7B:
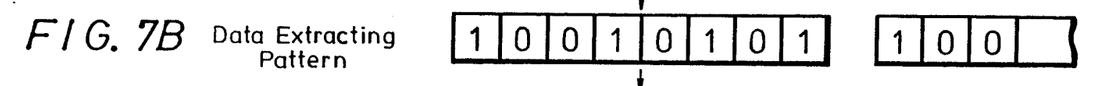
Figure 7C:
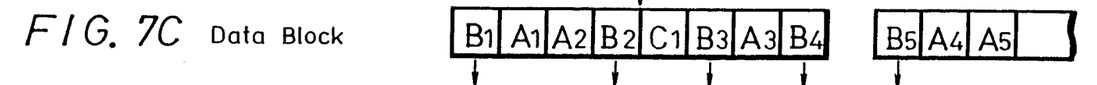
Figures 7D, 7E:
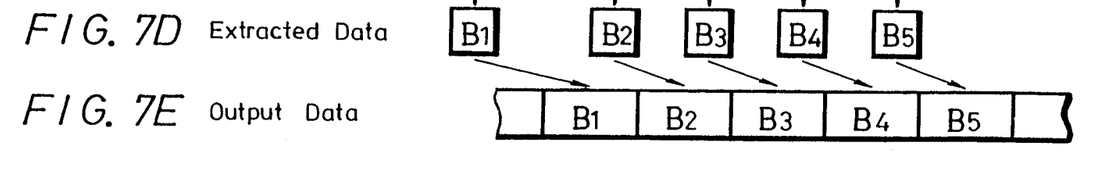

The transmitted signal, after being demodulated by a demodulator 61 provided in each of the tuners 6a, 6b, 6c . . . , is supplied to a synchronizing bit detector 10g provided in the main receiver 10 of the receiving terminal B. In the synchronizing bit detector 10g, the service bit is extracted from the transmitted signal and supplied to a service bit detector 10h wherein the information contained in the service bit is analyzed and then supplied to a controller 10i. If the service bit contained in a transmitted signal and having the aforementioned time-division multiplexed data block as shown in FIG. 6 is analyzed, the service bit slot information as shown in FIG. 7A is obtained by the analysis carried out by the service bit detector 10h. The slot information is supplied to the controller 10i. Then, the transmitted signal is supplied from the synchronizing bit detector 10g to a data extractor 10j wherein the required slot data is extracted according to a command from the controller 10i. If the channel selection switches 101 on the front panel of the main receiver 10 are operated so as to extract the data B from a data block as shown in FIG. 7C, a data extracting pattern as shown in FIG. 7B for extracting only the data B is generated by the controller 10i in response to the slot information as shown in FIG. 7A. The data extracting pattern is supplied to the data extractor 10j to thereby obtain the extracted data as shown in FIG. 7D which exclusively has the data B. The extracted data is then supplied to a data output section 101.

The controller 10i supplies a PLL circuit 10k with an oscillation control signal on the basis of the service bit information of the data B, whereby an oscillating signal is generated by the PLL circuit 10k and supplied to the data output section 101, under control of the controller 10i. To be specific, the service speed of the data B ($4f_0$ in this case) is first detected on the basis of the service bit information, the PLL circuit 10k is commanded to oscillate an oscillating signal having the frequency $4f_0$, and the data B obtained at the data output section 101 is converted into a signal having the service speed $4f_0$, as shown in FIG. 7E, which is delivered to an output terminal 10m. Then, the output signal is supplied to one of the terminals 10d–10f in the receiving terinal B which is connected to an apparatus which needs the output signal.

Thus, the time-division multiplexing of data in the format shown in FIG. 3 and decoding from the formatted data are carried out as described above.

The relationship between the above data block and the service speed $f_0$ at which one bit is transmitted per one multi-frame is as follows:

If the transmission rate of data is determined as $nf_0$ ($n=1, 2, 3 \ldots N$), the data block is represented by M bits ($M \leq N$) and the transmission cyclic period of data block is represented by $k/f_0$ (K is an integer). (For example, M=156 bits, $F_0$=11.025 kHz (multi-frame frequency)).

As described above, according to the present invention, it is possible to multiplex data in a data block which is arranged in a predetermined format efficiently to use the data block by time-division multiplexing the data to be transmitted in the format shown in FIG. 3, and separating the multiplexed data. Therefore, it is also possible to transmit a variety of information with a relatively small transmission capacity. If data to be transmitted is re-sampled at a samplying frequency higher (e.g. 10 times higher) than the original bit rate clock frequency before multiplexing the same, the data can be transmitted at an arbitrary bit rate, that is, the bit rate clock frequency is not limited.

In the above described embodiment, the bit rate clock frequency is simply determined as $nf_0$ ($n=1, 2, 3 \ldots N$). However, by determining the data transmission rate as $2^m f_0$ ($2^m \leq N$) or $Nf_0$, the time-division multiplexing of data, and the separation of each data signal from the multiplexed data can be easily effected. For example, if it is assumed that a data block has a length of 8 bits, the bit rate clock frequency is limited to $2f_0$, $4f_0$ and $8f_0$. When the bit rate clock frequency is $8f_0$, every slot of the data block is successively used. When $4f_0$, every other slot is used, and when $2f_0$, every fourth slot is used. By thus limiting the bit rate clock frequency, the data bits can be arranged at a constant distance, and data multiplexing and separation of the multiplexed data can be easily carried out by a simple arrangement.

As is clearly understood from the explanation given above, the present invention is advantageous in that a plurality of the digital data can be efficiently time-division multiplexed and transmitted so that a variety of digital data can be transmitted with a relatively small transmission capacity.

The above description is of the preferred embodiment of the invention, but it will be apparent that many modifications and variations could be effected by one skilled in the art, without departing from the spirit or scope of the novel concepts of the invention so that the scope of the invention should be determined by the appended claims only.

We claim as our invention:

1. A digital signal transmitting system comprising:
a plurality of digital signal reproducers, each outputting a digital signal to be time-division multiplexed;
a digital data signal multiplexer connected to receive a frame synchronizing signal, a service bit signal and the output signals of said plurality of digital signal reproducers, for producing a block data signal including said frame synchronizing signal, siad service bit signal and a plurality of slot data bits arranged with said digital data signals each one bit within a multiple-frame, in which said service bit signal is indicative of the transmission mode and the slot data being transmitted with each of said plurality of digital data signals; and
means for modulating the output of said digital data signal multiplexer so as to transmit the same through a transmission line with plural channel signals;
a plurality of tuners, each being supplied with said channel signals, means for demodulating a selected one channel; and
means for transmitting the demodulated multiplexed digital signal through an optical fiber cable to a corresponding receiver terminal, said receiver terminal including:
(a) a frame synchronizing signal detector for detecting the frame synchronizing signal from said block data signal;
(b) a service bit detector for detecting the service bit signals from said block data signal;
(c) a controller supplied with the slot data from the output of said service bit detector and for producing a data extracting pattern in response to said slot data; and
(d) a data extractor supplied with the data extracting pattern so as to produce a predetermined digital data signal.

2. A digital signal transmitting system according to claim 1, in which said transmission mode is selected to transmit selected signals from the group including stereo digital audio signals, a combination of digital data with monaural digital audio signals, and all digital data signals.

3. A digital signal transmitting system according to claim 2, including means for designating selected signals which are stereo digital audio signals to identify a characteristic thereof.

4. A digital signal transmitting system according to claim 1, in which the transmission rate of said block data signal is selected to be $n \cdot f_0$; where $n=1, 2, 3 \ldots N$, N is equal to the maximum data slot number in said multiple-frame, and $f_0$ is the frequency of said multiple-frame.

5. A digital signal tranmitting system according to claim 1, in which the transmission rate of said block data signal is selected to be $2^m \cdot f_0$; wherein $2^m \leq N$, N is equal to the maximum data slot number in said multiple-frame, and $f_0$ is the frequency of said multiple-frame.

6. A digital signal transmitting system according to claim 1, in which said service bit signal of a multi-super-frame, which includes a plurality of super-frames consisting of a plurality of said multiple-frames, comprises with a block service bit signal.

7. A digital signal transmitting system according to claim 6, in which the slot data to be transmitted with a plurality of programs are multiplexed within said block service bit signal.

8. A digital signal transmitting system according to claim 1, wherein said modulator modulates the multiplexed digital signal from said digital signal multiplexer on a carrier of a CATV channel, and means for mixing said modulated carrier with other modulated CATV carrier signals.

9. In a digital signal transmitting system comprising a plurality of digital signal reproducers, a digital data signal multiplexer supplied with the output of said digital signal reproducers so as to produce a block data signal including a time-division multiplexed signal thereof with a frame synchronizing signal and a service bit signal indicative of the multiplexed signal arrangement and the respective digital signal speed, modulating means for modulating the output of said digital data signal multiplexer for transmitting the same through a transmission line, and receiving terminals for demodulating the multiplexed digital signal received through said transmission line, said receiving terminals comprising;
- a frame synchronizing signal detector for detecting the frame synchronizing signal from said block data signal;
- a service bit detector for detecting the service bit signal from said block data signal in cooperation with said frame synchronizing signal;
- a controller supplied with the output of said service bit detector for producing a data extracting pattern in response to said service bit signal indicative of the multiplexed signal arrangement and for producing a signal indicative of the speed of the signal to be extracted;
- a data extractor supplied with said data extracting pattern for extracting a predetermined digital signal from said multiplexed digital signal;
- an oscillator supplied with said speed indicating signal for producing an oscillating signal with a frequency corresponding to the speed indicating signal used for adjusting the bit timing to extract said predetermined digital signal; and
- a data outputting means for producing an original data signal prior to the multiplexing from the signal supplied from said data extractor and the oscillating signal supplied from said oscillator.

* * * * *